UNITED STATES PATENT OFFICE.

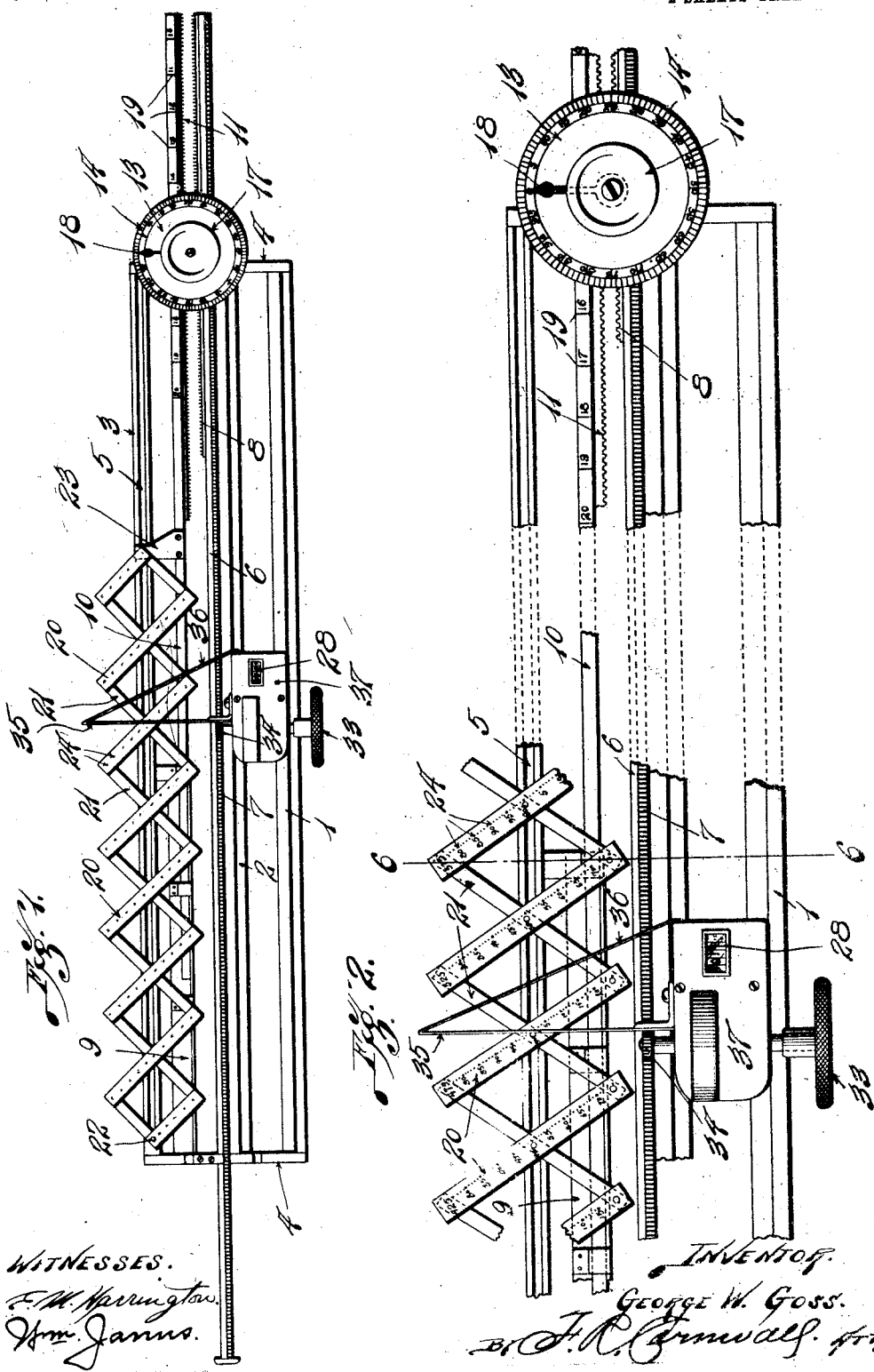

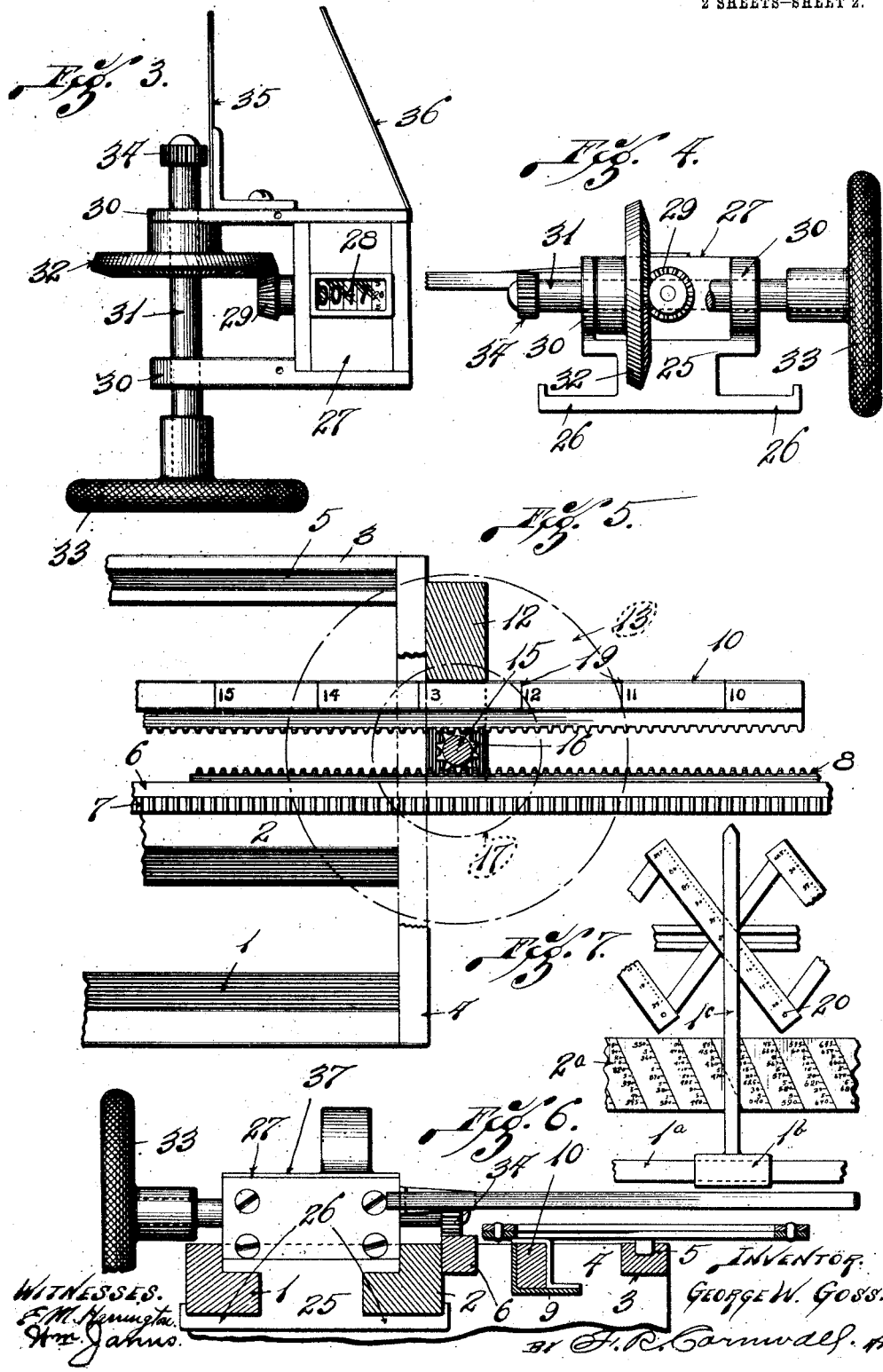

GEORGE W. GOSS, OF ST. LOUIS, MISSOURI, ASSIGNOR TO GOSS-ACREY CALCULATOR COMPANY, OF ST. LOUIS, MISSOURI, A CORPORATION OF MISSOURI.

CALCULATING-MACHINE.

1,024,072.  Specification of Letters Patent.  Patented Apr. 23, 1912.

Application filed February 23, 1911. Serial No. 610,345.

*To all whom it may concern:*

Be it known that I, GEORGE W. GOSS, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1 is a plan view of a calculating machine of my improved construction. Fig. 2 is an enlarged plan view of a portion of my improved calculating machine including the longitudinally adjustable housing in which the indicating mechanism is located, and the dial on which is arranged a circular scale designed to indicate the fractional parts of a cent. Fig. 3 is an enlarged plan view of the sliding member which carries the indicating mechanism in the form of a series of disks, and which indicating mechanism is actuated by the means utilized in shifting the sliding member upon its support. Fig. 4 is an end elevation of the sliding member carrying the indicating mechanism. Fig. 5 is an enlarged plan view of the right hand end of the frame of the calculator with parts broken away for the purpose of clearly illustrating the means employed for simultaneously imparting simultaneous movement to a pair of sliding bars. Fig. 6 is an enlarged cross section taken approximately on the line 6—6 of Fig. 2. Fig. 7 is a plan view of a portion of the machine and showing a modified form of the result indicating means.

My invention relates generally to calculating machines and more particularly to that class of devices wherein it is desired to ascertain a result, representing a sum of money where two factors are known, as for instance the weight in pounds of a certain product and the selling or cost price per pound of the product.

The calculating machine herein shown and described is particularly designed for easily and quickly ascertaining the exact cost or price to be paid for cotton, which is usually sold in large bales, and the price per pound of which varies from day to day, said price sometimes going into mills and occasionally fractional parts of mills. To correctly figure the cost or price of a large number of bales of cotton of different weights, and at a price including cents, mills and fractional parts of mills, without the use of some mechanical means or rate sheets, involves considerable time and labor, and it is the purpose of my invention to provide means for readily and accurately ascertaining the desired results, where a commodity is being bought and sold for an amount of money running into cents, mills and fractional parts of mills.

In the following description, I have referred to the machine as being particularly adapted for calculating values and weights of cotton, but it will be readily understood that the same machine can be utilized for quickly and correctly ascertaining the weights and cost or selling prices of grain, hay, coal, and ore, or any commodity which is sold in bulk by weight for a price running into cents, mills and fractions thereof.

My invention consists generally in a frame, a series of members arranged for movement thereon, which members are provided with graduated scales properly numbered, means for proportionately actuating the movable members, and an adjustable pointer coöperating with one of the scales, and a registering and indicating mechanism, which is movable with the pointer, and which registering and indicating mechanism gives the correct figures when the machine is properly operated.

My invention further consists in certain features of novelty hereinafter more fully described and claimed. In the construction of my improved calculating machine I make use of an elongated skeleton frame comprising a front rail 1, middle rail 2 and rear rail 3, said rails being parallel with one another and framed together at their ends by suitable plates 4, which if desired can be extended downward to form supporting legs for the machine. The rails 1 and 2 are preferably L-shaped in cross section and the rear rail 3 is provided in its top surface with a longitudinally extending groove 5.

Arranged to slide lengthwise of the frame immediately to the rear of the center rail 2 is a rail 6 in the top surface of which is formed a series of rack teeth 7, and formed on the rear face of the right hand portion of this rail 6 is a series of rack teeth 8.

9 designates a short rail L-shaped in cross section, and extending from the right hand of plate 4 to a point adjacent the center of the frame of the machine, and arranged to slide on this rail and upon the right hand end frame 4 is a rail 10, on the front side of the right hand portion of which is formed a series of rack teeth 11 corresponding to the rack teeth 8.

Rigidly fixed to a bracket 12 projecting from the right hand of plate 4 is a disk 13 which overlies the sliding rails 6 and 10, and formed on the face of said disk, adjacent the edge thereof is a graduated scale 14, and in the present instance this scale is shown with one hundred divisions, each one of said divisions representing one-tenth of one mill.

Journaled for rotation in the center of the disk 13 is a short vertical shaft 15, the lower end of which carries a pinion 16, which meshes with the racks 8, and 11. Carried by the upper end of the shaft 15 is a knob or disk 17, by means of which said shaft and the pinion 16 are rotated, and projecting from the shaft 15 beneath this knob 17, is a pointer 18 in the form of a hand, the point of which travels over the face of the disk immediately adjacent the scale 14.

Formed on the top of the right hand portion of the rail 10 is a series of equally spaced marks 19, which in the present instance are numbered consecutively from ten to twenty, and reading from right to left, and these indicating marks and figures represent the cents per pound of the cotton or other commodity being sold. It will be readily understood that the scale formed by the marks 19 is arranged, divided and numbered in accordance with the commodity being sold.

A series of lazy tong levers 20 and 21 are pivotally connected to one another for operation in the usual manner, and the left hand pair of said levers are pivotally mounted upon a pin 22 seated in the left hand end of the rail 3. The pivot pins which connect the centers of these levers 20 and 21 project downward into and are arranged to travel through the groove 5. (See Fig. 6.) The outer ends of the right hand pair of levers 20 and 21 are pivotally connected to the outer end of a bracket 23, and the inner end of said bracket is fixed to the sliding rail 10. The top surfaces of the levers 20 are each provided with a series of marks 24 equally spaced apart, and every fifth mark is provided with an indicating numeral, thus forming an expanding scale, which in the present instance is numbered from 350 to 700, reading from left to right, and representing the pounds of cotton being sold. The scale just described is arranged in the form of lazy tongs for the purpose of compactness, for it will be readily understood that a scale formed on a continuous bar and running from 350 to 700, would require considerable space. This expanding scale is numbered from 350 to 700, for the reason that all bales of cotton weigh at least 350 pounds and not over 700 pounds.

Arranged to slide upon the L-shaped rails 1 and 2 is a block 25 provided with arms 26, which extend beneath said rails and mounted upon said block is a housing 27, in which is arranged a counting and indicating mechanism, preferably of the type now in general use and employing a series of four or five disks or counting wheels arranged side by side, and connected so that when one of the said wheels or disks has made one revolution it operates the adjacent wheel to move the same one-tenth of a revolution, and simultaneously the adjacent wheel upon making a complete revolution imparts partial rotation to the next adjacent wheel.

The top of the housing 27 is provided with a glazed opening 28 through which the numbered edges of the counting disks or wheels are visible. The shaft of this counting mechanism projects through the side wall of the housing 27 and fixed thereon is a beveled pinion 29.

Projecting laterally from the block 25 is a pair of brackets 30 in which is journaled a shaft 31 carrying a beveled gear wheel 32, which meshes with the pinion 29. Carried by the forward end of the shaft 31 in front of the rail 1 is a disk 33, which is manually engaged for the purpose of imparting rotary motion to the shaft 31, and carried by the rear end of said shaft 31 is a pinion 34, which meshes with the rack teeth 7.

Fixed to and projecting rearwardly from the rear one of the brackets 30 and overlying the levers 20 is a pointer or indicator 35 in the form of a narrow metal strip or finger, and connecting the outer end thereof with the rear corner of the housing 27 is a brace 36. A housing plate 37 is fixed to the housing 27 and covers the pinion 29 and beveled gear 32.

The operation of my improved calculating machine is as follows: Assuming that a buyer is purchasing a bale of cotton weighing 573 pounds at the rate of 11¾¢ per pound, the knob 17 is manually engaged and rotated in such a manner as that the pinion 16 by its rotary movement shifts the bar 10 lengthwise until the indicating mark designated 11 appears immediately beneath the right hand edge of the disk 13. At this point the pointer or finger 18 points directly to the zero on the scale 14 around the edge of the disk 13, and the knob 17 is now turned toward the right hand until the end of the pointer is at the mark on the scale 14 designated by 75. During the rotary motion of the shaft 15 and the pinion 16 carried thereby the rails 6 and 10 correspondingly move in opposite directions, and as the rail 10 is moved lengthwise the lazy tong levers 20 and 21 are correspondingly moved upon their pivot points and consequently change positions. The disk 33 is now manually engaged and rotated in a manner so that the pinion 34 meshing with the rack 7 will cause the block 25 to slide lengthwise upon the rails 1 and 2 until the pointer or indicator 35 is in direct vertical alinement with the mark or dot numbered 573 upon the scale formed on the tops of the levers 20. As the disk 33 and lever 31 are rotated to thus correctly position the block 25 and parts carried thereby, the beveled gear wheel 32 drives the pinion 29, and as a result the counting wheels or disks within the housing 27 are rotated and owing to the proportionate sizes of the pinion 29 and gear wheel 32, and the various racks, scales and operating parts of the calculating machine the result shown upon the edges of the disks or wheels in the housing 27 and disclosed through the glazed opening 28 correctly indicate the amount in dollars and cents to be paid for the bale of cotton being sold.

It will be readily understood that the operations just described can be very rapidly performed and thus where a large number of bales of cotton of different weights are being sold much time and labor is saved in ascertaining the exact price to be paid for each individual bale.

As hereinbefore stated my improved calculating machine can be advantageously used for ascertaining the cost price of any commodity which is sold by weight, and at varying prices per pound, as for instance wagon and car loads of grain, coal, mineral, baled hay or any commodity which is sold in bulk and at prices which fluctuate from day to day.

Where a large amount of a certain commodity is purchased for a lump sum price, as for instance 678 pounds of ore for $5.23, and it is desired to quickly ascertain the exact price per pound paid for said commodity the operator manually engages the disk 33 and rotates the shaft 31 until the number 523, representing the amount paid, is observed through the glazed opening 28, and simultaneously with this operation the knob 17 is manually engaged and rotated to move the lazy tong levers backward or forward as the case may be until the indicating mark 24 on the scale formed on the levers 20 and numbered 678, is in a position directly beneath the pointer or finger 35, and when the parts are so positioned, that is with the number 523 visible through the glazed opening 28, and the indicating mark 678 is directly beneath the pointer or finger 35, the price in cents and fractions thereof will be disclosed by the scale on the right hand end of the bar 10 and the scale on the surface of the disk 13.

A modified construction of the calculating machine is disclosed in Fig. 7, and in this modification the sliding block 25, carrying the housing 27, and the sliding rail 6 are done away with and the rail 2 is replaced by a wide rail $2^a$ on the top face of which is arranged a scale divided into a series of inclined rows of figures representing dollars and cents. In this modified construction the points or indicating marks on the tops of the lazy tong levers 20 and 21 are numbered consecutively beginning with 1 at the left hand end of the extensible scale.

The front rail $1^a$ has mounted to slide thereon a sleeve $1^b$, and which sleeve carries a finger or pointer $1^c$ which overlies the top surface of the rail $2^a$, and the top surfaces of the lazy tong levers 20 and 21, the sleeve $1^b$ and finger $1^c$ are moved lengthwise of the machine upon the rail $1^a$, and when the pointer overlies the proper indicating mark of the scale on the levers 20, after the lazy tong levers have been properly positioned, the amount indicated on the scale on the top of the rail $2^a$ is the correct price or cost of the commodity being sold.

It will be readily understood that minor changes in the form, size and shape of the various parts of my improved calculating machine can be readily made and substituted for those herein shown and described without departing from the spirit of my invention, the scope of which is set forth in the appended claims.

I claim:

1. In a calculating machine, a frame, a counting and indicating means arranged for sliding movement upon said frame, an extensible scale, a pointer carried by the counting and indicating means, which pointer overlies the extensible scale, and means for simultaneously and proportionately moving the counting and indicating means and the extensible scale in opposite directions.

2. In a calculating machine, a frame, a counting and indicating means arranged for sliding movement upon said frame, an extensible scale, a pointer carried by the counting and indicating means, which pointer overlies the extensible scale, means for simultaneously and proportionately moving the counting and indicating means and the extensible scale in opposite directions, and means for registering the movement of the extensible scale and the movement of the counting and indicating mechanism.

3. In a calculating machine, the combination with a movable counting mechanism, of an extensible scale, means whereby the movement of the extensible scale relative to the counting mechanism is indicated, and means including a rack and pinion for simultaneously and proportionately moving the counting mechanism and the extensible scale.

4. In a calculating machine, the combination with a movable counting mechanism, of an extensible scale, means whereby the movement of the extensible scale relative to the counting mechanism is indicated, means for simultaneously and proportionately moving the counting mechanism and the extensible scale, and means for indicating the movement of the extensible scale and counting mechanism actuating means.

5. In a calculating machine, a frame, an extensible scale thereon, means for moving said extensible scale, means for registering the movement imparted to the extensible scale, a counting mechanism arranged for movement on the frame and a pointer carried by said counting mechanism, which pointer overlies the extensible scale.

6. In a calculating machine, a frame, an extensible scale thereon, a rack and pinion for moving said extensible scale, means for registering the movement of said extensible scale, a pointer overlying the extensible scale, and means for registering the movement and position of the pointer.

7. In a calculating machine, the combination with a movable counting mechanism, of an extensible scale, means including racks and pinions for simultaneously and proportionately moving the counting mechanism and the extensible scale, and indicating means for governing the movement imparted to the counting mechanism and the extensible scale.

8. In a calculating machine of the class described, an extensible scale comprising a series of lazy tong levers, certain of which levers are provided with indicating marks to form the scale and means including a rack and pinion for simultaneously swinging all of the levers upon their pivots.

9. In a calculating machine of the class described, a frame, an extensible scale mounted thereon, an indicating mechanism arranged for movement on the frame, a pointer extending from the counting mechanism over the extensible scale, a pair of rails mounted to slide on the frame, racks on said rails, a pinion engaging with said racks for simultaneously and proportionately moving the same, and a third rack on one of said sliding rails, which third rack is engaged by a movable part of the counting mechanism.

10. In a calculating machine of the class described, an extensible scale, a rack and pinion for changing the position of said extensible scale, means for registering the position of the extensible scale after movement, a movable pointer overlying the extensible scale, and means for registering the position of the pointer.

11. In a calculating machine of the class described, an extensible scale comprising a series of lazy tong levers, certain of which levers are provided with indicating marks to form a scale, means including racks and pinions for simultaneously changing the positions of the lazy tong levers, a movable pointer overlying the extensible scale and means for registering the position of the pointer after the movement over the extensible scale.

12. In a calculating machine of the class described, an extensible scale, a sliding bar connected thereto, there being indicating marks formed on the face of said sliding bar, rotary means for imparting sliding movement to the bar to change the position of the extensible scale, and a circular scale for registering the movement of the sliding bar actuating means.

In testimony whereof I hereunto affix my signature in the presence of two witnesses, this 15th day of February, 1911.

GEORGE W. GOSS.

Witnesses:
M. P. SMITH,
MABEL COONEY.